(12) United States Patent
Hsu et al.

(10) Patent No.: US 11,731,729 B2
(45) Date of Patent: Aug. 22, 2023

(54) RECIPROCATING MECHANISM, BICYCLE, AND METHOD OF ACHIEVING RECIPROCATING MOTION

(71) Applicant: SUNNY WHEEL INDUSTRIAL CO., LTD., Changhua County (TW)

(72) Inventors: Hsin-hsiang Hsu, Changhua County (TW); Wen-wang Huang, Changhua County (TW); Kuo-chung Hsu, Changhua County (TW)

(73) Assignee: SUNNY WHEEL INDUSTRIAL CO., LTD., Changhua County (TW)

( * ) Notice: Subject to any disclaimer, the term of this patent is extended or adjusted under 35 U.S.C. 154(b) by 0 days.

(21) Appl. No.: 17/771,497

(22) PCT Filed: Oct. 25, 2019

(86) PCT No.: PCT/CN2019/113231
§ 371 (c)(1),
(2) Date: Apr. 25, 2022

(87) PCT Pub. No.: WO2021/077390
PCT Pub. Date: Apr. 29, 2021

(65) Prior Publication Data
US 2022/0355896 A1 Nov. 10, 2022

(51) Int. Cl.
*B62M 1/26* (2013.01)
*B62M 1/20* (2006.01)

(52) U.S. Cl.
CPC ............... *B62M 1/26* (2013.01); *B62M 1/20* (2013.01)

(58) Field of Classification Search
CPC .................................. B62M 1/20; B62M 1/26
See application file for complete search history.

(56) References Cited

U.S. PATENT DOCUMENTS

| 594,980 A | * | 12/1897 | Booth et al. | ............. | B62M 1/26 74/48 |
| 4,561,668 A | * | 12/1985 | Klopfenstein | ........... | B62M 1/26 280/226.1 |

(Continued)

FOREIGN PATENT DOCUMENTS

| CN | 2103506 U | 5/1992 |
| CN | 1087059 A | 5/1994 |

(Continued)

*Primary Examiner* — Kevin Hurley
(74) *Attorney, Agent, or Firm* — CKC & Partners Co., LLC (57) ABSTRACT

A reciprocating mechanism includes a first connecting element, a crankshaft and a second connecting element. The crankshaft includes a rotation shaft, a first following element and a second following element. The first following element is pivotally disposed on one side of the rotation shaft and movably coupled to the first connecting element. The second following element is pivotally disposed on the other side of the rotation shaft, and a first angle is formed between the first following element and the second following element. The second connecting element is movably coupled to the second following element. The first following element and the second following element are configured to rotate around the rotation shaft so as to be movably coupled to and cause each of the first connecting element and the second connecting element to reciprocate and cyclically pivot along an arc-shaped trajectory.

14 Claims, 11 Drawing Sheets

(56) References Cited

U.S. PATENT DOCUMENTS

| | | | | |
|---|---|---|---|---|
| 4,664,400 | A * | 5/1987 | Date | B62M 1/26 280/226.1 |
| 5,848,955 | A * | 12/1998 | Gooch | A63B 71/0009 601/36 |
| 6,439,590 | B1 * | 8/2002 | Liang | B62K 3/002 280/288.1 |
| 6,764,088 | B2 * | 7/2004 | Hung | B62M 1/26 280/259 |
| 7,717,446 | B2 * | 5/2010 | Pate | B62M 1/26 280/220 |
| 8,162,337 | B2 * | 4/2012 | Teal | B62M 1/26 280/221 |
| 9,527,547 | B2 * | 12/2016 | Thomas | A63B 23/03583 |
| 11,034,403 | B2 * | 6/2021 | Lewis | B62M 1/28 |
| 2003/0047902 | A1 * | 3/2003 | Miller | B62M 1/26 280/253 |

FOREIGN PATENT DOCUMENTS

| | | | | |
|---|---|---|---|---|
| CN | 1623848 | A * | 6/2005 | |
| CN | 2709296 | Y | 7/2005 | |
| CN | 100450866 | C | 1/2009 | |
| CN | 201906444 | U | 7/2011 | |
| CN | 102689671 | A | 9/2012 | |
| CN | 203996721 | U | 12/2014 | |
| CN | 108945224 | A | 12/2018 | |
| CN | 109911095 | A | 6/2019 | |
| DE | 20216348 | U1 | 1/2003 | |
| FR | 2767174 | A1 * | 2/1999 | B62M 1/26 |
| KR | 950001817 | B1 | 3/1995 | |
| KR | 20110008687 | A | 1/2011 | |
| TW | M590561 | U | 2/2020 | |
| WO | WO-2010047521 | A2 * | 4/2010 | A63B 21/15 |
| WO | WO-2017147342 | A1 * | 8/2017 | |

\* cited by examiner

RECIPROCATING MECHANISM, BICYCLE, AND METHOD OF ACHIEVING RECIPROCATING MOTION

RELATED APPLICATIONS

This application is a national phase entry application of International Application No. PCT/CN2019/113231 filed on Oct. 25, 2019, the entire content of which is incorporated herein by reference in their entirety.

BACKGROUND

Technical Field

The present disclosure relates to a reciprocating mechanism and a method of achieving a reciprocating motion; more particularly, the present disclosure relates to a reciprocating mechanism and a method of achieving a reciprocating motion, which can simulate a horse-riding exercise, as well as a bicycle, a horse-riding machine or a similar apparatus applying the reciprocating mechanism and the method of achieving the reciprocating motion to implement the travel function.

Description of Related Art

Recently, due to the fact that residents pay more and more attention to personal health, the sports atmosphere is also becoming more and more prosperous. Among many types of sports, bicycle riding is undoubtedly to be popular. When cycling or riding a bicycle, it can exercise muscular endurance, cardiopulmonary function and coordination of hands and feet at the same time, which can be said to be a combination of various sports and exercise functions.

However, most of the bicycle riders focus on exercising the lower extremity movement, and they fail to take into account the exercise of the rest of the body. Therefore, there is still a need to develop an exercise apparatus that can exercise multiple body parts while riding a bicycle.

In addition, there are already horse-riding machines on the market, which can achieve a reciprocating motion so that the rider can simulate a horse-riding motion and achieve the effect of whole body exercise. However, limited by its mechanism, the exercise effect is usually not as expected, or because its mechanism is too complicated, its overall manufacturing cost is too high or the maintenance is not easy.

SUMMARY

According to one aspect of the present disclosure, a reciprocating mechanism includes a first connecting element, a crankshaft and a second connecting element. The crankshaft includes a rotation shaft, a first following element and a second following element. The first following element is pivotally disposed on one side of the rotation shaft and movably coupled to the first connecting element. The second following element is pivotally disposed on the other side of the rotation shaft, and a first angle is formed between the first following element and the second following element. The second connecting element is movably coupled to the second following element. The first following element and the second following element are configured to rotate around the rotation shaft so as to be movably coupled to and cause each of the first connecting element and the second connecting element to reciprocate and cyclically pivot along an arc-shaped trajectory.

According to another aspect of the present disclosure, a bicycle includes a frame, a reciprocating mechanism, a seat cushion, a gear, a bracket, a first tire and a belt body. The reciprocating mechanism is mounted on the frame and includes a first connecting element a crankshaft and a second connecting element. The crankshaft includes a rotation shaft, a first following element and a second following element. The first following element is pivotally disposed on one side of the rotation shaft and movably coupled to the first connecting element. The second following element is pivotally disposed on the other side of the rotation shaft, and a first angle is formed between the first following element and the second following element. The second connecting element is movably coupled to the second following element, and a second angle is formed between the second connecting element and the second following element. The seat cushion is pivotally connected to the first connecting element. The gear is sleeved on the rotation shaft. The second connecting element is pivotally connected to one side of the bracket. The first tire is mounted on the frame. The belt body is wound around the gear and movably coupled to the first tire. The first following element and the second following element are configured to rotate around the rotation shaft so as to be movably coupled to and cause each of the first connecting element and the second connecting element to reciprocate and cyclically pivot along an arc-shaped trajectory, so as to drive the bracket and the seat cushion to reciprocate and cyclically pivot, thereby the belt body is movably coupled to and causes the first tire to simultaneously rotate via the gear being driven to rotate by the rotation shaft.

According to further another aspect of the present disclosure, a method of achieving a reciprocating motion includes providing a crankshaft, wherein the crankshaft includes a rotation shaft, a first following element and a second following element, and the first following element and the second following element are able to relatively rotate around the rotation shaft; providing a first connecting element, causing the first connecting element to be movably coupled to the first following element; providing a second connecting element, causing the second connecting element to be movably coupled to the second following element; causing the first following element and the second following element to rotate around the rotation shaft so as to be movably coupled to and cause each of the first connecting element and the second connecting element to reciprocate and cyclically pivot along an arc-shaped trajectory.

DETAILED DESCRIPTION

Figure 1:
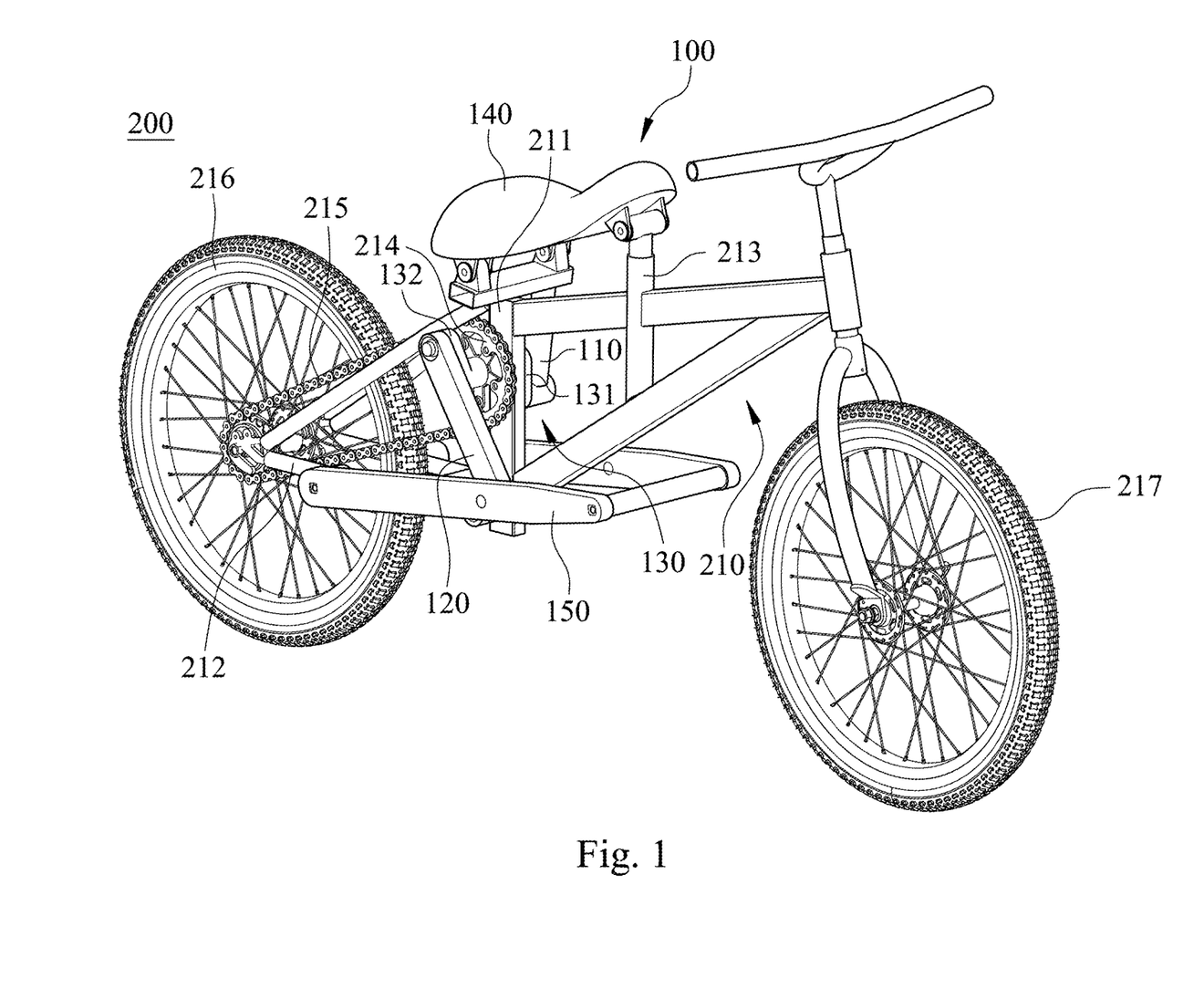
FIG. 1 is a schematic view of a three-dimensional structure of a bicycle according to an embodiment of the present disclosure.
Figure 2:
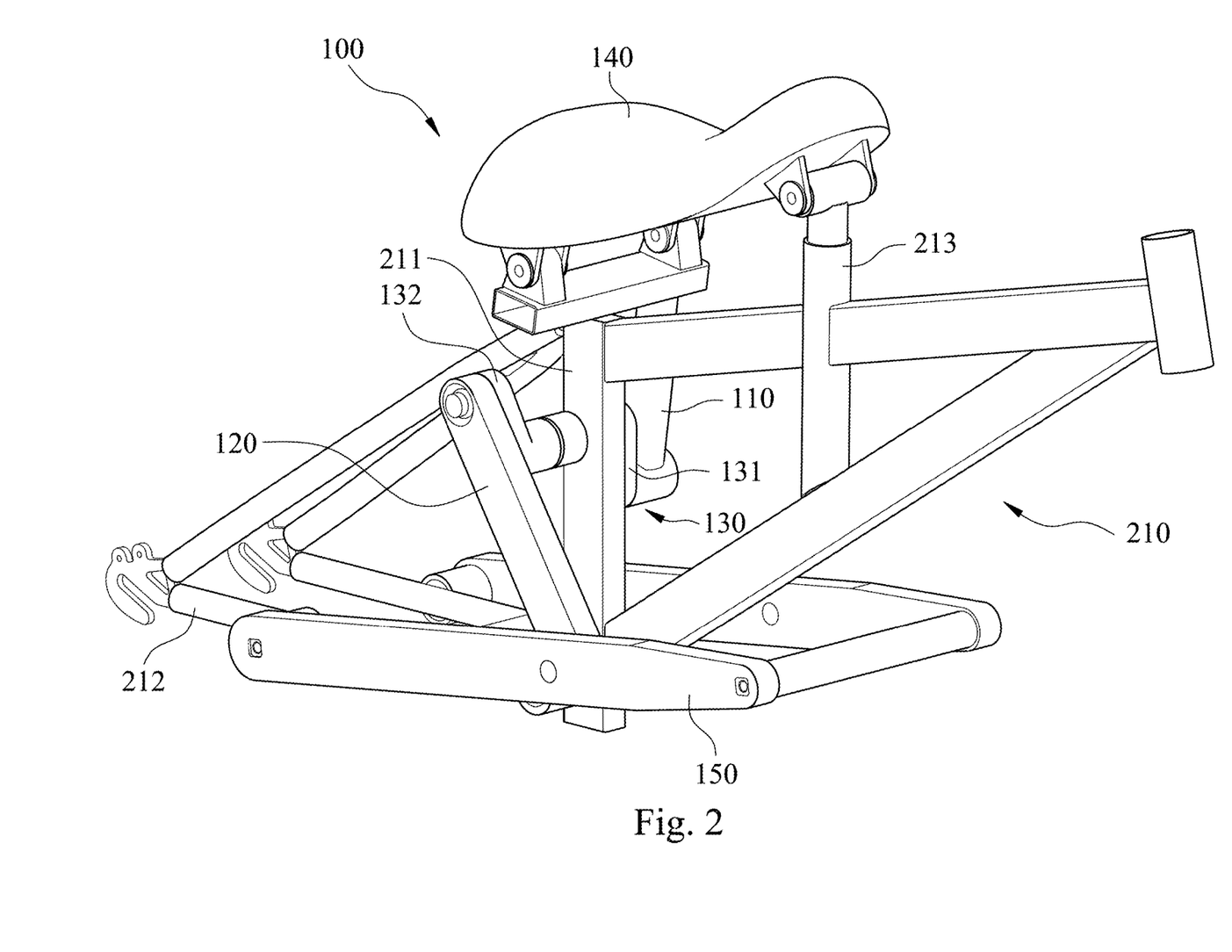
FIG. 2 is a left schematic view of a three-dimensional structure of a reciprocating mechanism of the bicycle according to the embodiment in FIG. 1.
Figure 3:
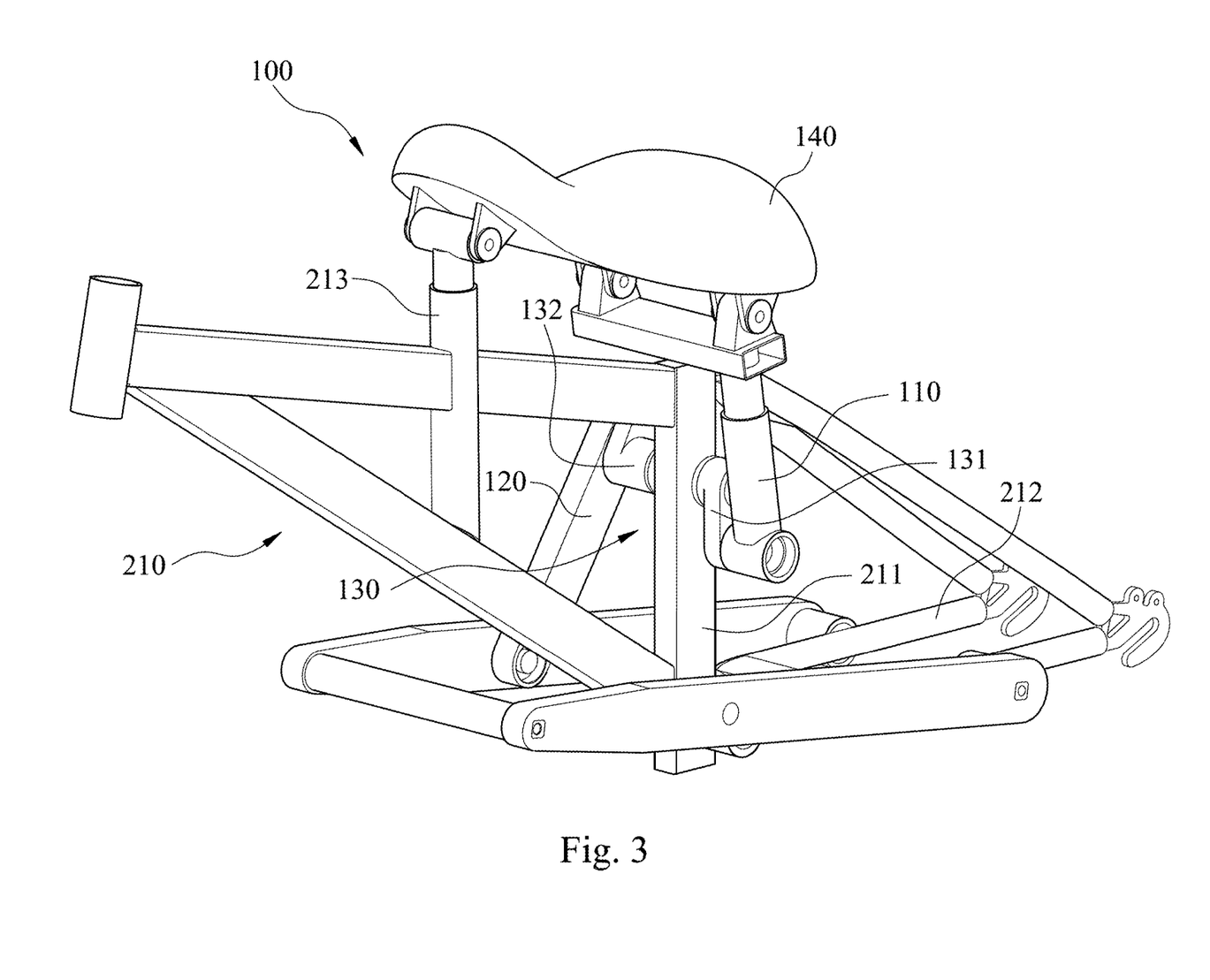
FIG. 3 is a right schematic view of the three-dimensional structure of the reciprocating mechanism of the bicycle according to the embodiment in FIG. 1.
Figure 4:
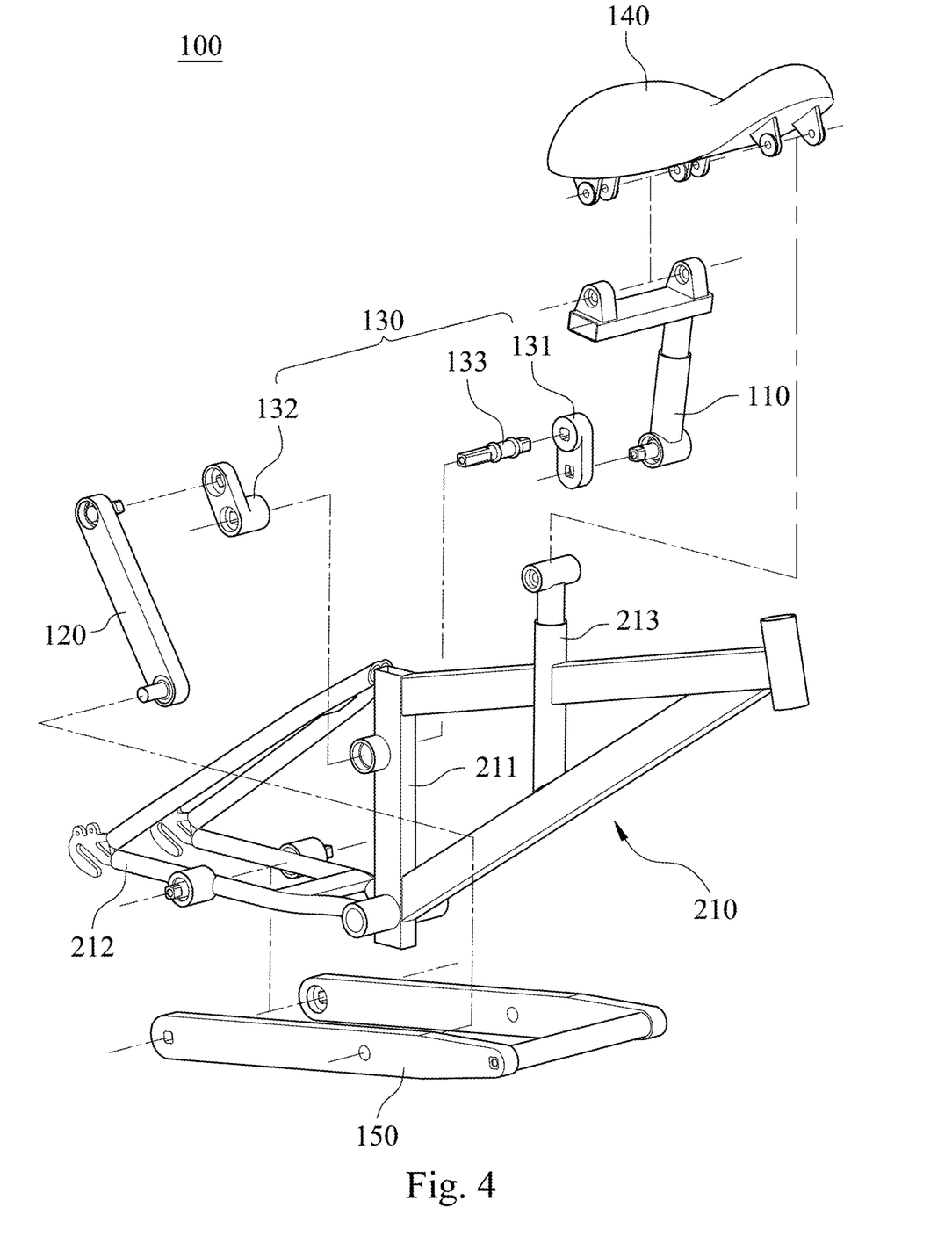
FIG. 4 is an exploded view of the reciprocating mechanism of the bicycle according to the embodiment in FIG. 1.
Figure 5:
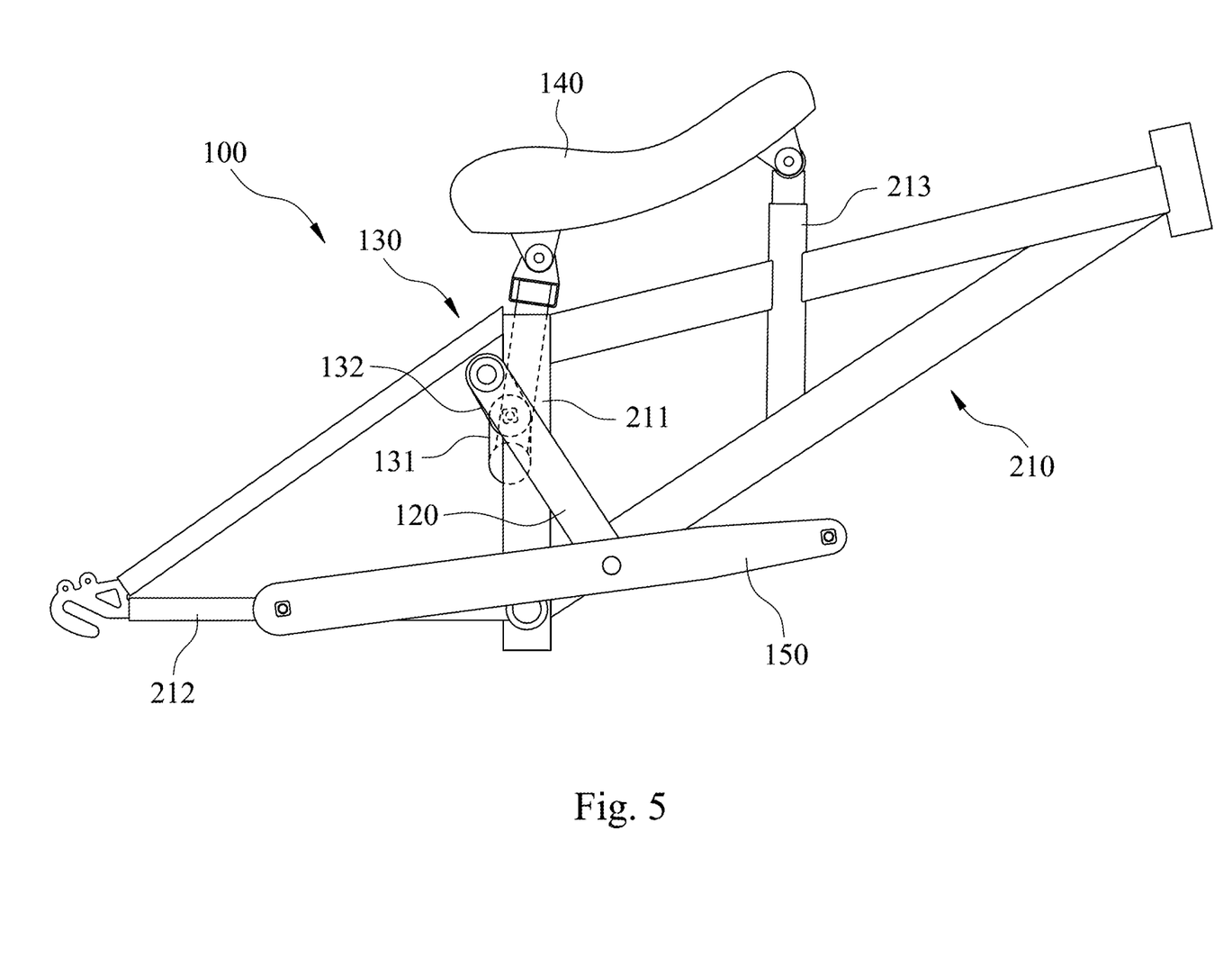
FIG. 5 is a left planar schematic view of the reciprocating mechanism of the bicycle according to the embodiment in FIG. 1.

With reference to FIG. 1 to FIG. 5, FIG. 1 is a schematic view of a three-dimensional structure of a bicycle 200 according to an embodiment of the present disclosure; FIG. 2 is a left schematic view of a three-dimensional structure of a reciprocating mechanism 100 of the bicycle 200 according to the embodiment in FIG. 1; FIG. 3 is a right schematic view of the three-dimensional structure of the reciprocating mechanism 100 of the bicycle 200 according to the embodiment in FIG. 1; FIG. 4 is an exploded view of the reciprocating mechanism 100 of the bicycle 200 according to the embodiment in FIG. 1; FIG. 5 is a left planar schematic view of the reciprocating mechanism 100 of the bicycle 200 according to the embodiment in FIG. 1. The present disclosure provides the reciprocating mechanism 100 and the bicycle 200 with the reciprocating mechanism 100 mounted thereon. The reciprocating mechanism 100 includes a first connecting element 110, a crankshaft 130 and a second connecting element 120. The crankshaft 130 includes a rotation shaft 133, a first following element 131 and a second following element 132. The first following element 131 is pivotally disposed on one side of the rotation shaft 133 and movably (operatively) coupled to the first connecting element 110. The second following element 132 is pivotally disposed on the other side of the rotation shaft 133 and movably coupled to the second connecting element 120. The first following element 131 and the second following element 132 are configured to rotate around the rotation shaft 133 so as to be movably coupled to and cause each of the first connecting element 110 and the second connecting element 120 to reciprocate and cyclically pivot along an arc-shaped trajectory. The reciprocating mechanism 100 may further include a seat cushion 140 and a bracket 150. The seat cushion 140 is pivotally connected to the first connecting element 110. The second connecting element 120 is pivotally connected to one side of the bracket 150. Therefore, through the first connecting element 110 and the second connecting element 120, the seat cushion 140 and the bracket 150 being movably coupled to each other, a periodic movement along an arc-shaped trajectory simulating horse-riding is formed. In addition, a first angle is formed between the first following element 131 and the second following element 132, and a second angle is formed between the second connecting element 120 and the second following element 132. In an embodiment, the first angle may be greater than or equal to 120 degrees, and the second angle may be greater than 0.1 degrees. By controlling angular ranges of the first angle and the second angle, a direction of the periodic motion formed by the reciprocating mechanism 100 can be controlled.

The reciprocating mechanism 100 of the present disclosure can not only achieve or form a reciprocating motion simulating horse-riding, but also drive the bicycle 200 to displace at the same time, so as to achieve a traveling effect. Thus, in the embodiment of FIG. 1, the bicycle 200 includes a frame 210 provided for mounting the reciprocating mechanism 100 thereon, and the frame 210 includes frame tubes 211, 212, 213. The rotation shaft 133 of the reciprocating mechanism 100 is mounted on the frame tube 211. One end of the bracket 150 is pivotally connected to one side of the frame tube 212. One end of the seat cushion 140 is pivotally connected to the first connecting element 110, and the other end of the seat cushion 140 is pivotally connected to one end of the frame tube 213. The bicycle 200 further includes a gear 214, a belt body 215 and a first tire 216. The gear 214 is sleeved on the rotation shaft 133. The belt body 215 is wound around the gear 214 and movably coupled to the first tire 216. Thus, when the reciprocating motion is achieved or implemented by the reciprocating mechanism 100, the rotation shaft 133 of the crankshaft 130 can be driven or carried to rotate, so as to movably couple to and cause the gear 214 to rotate. Accordingly, the belt body 215 is movably coupled to and causes the first tire 216 of the bicycle 200 to rotate, so as to drive the second tire 217 to rotate and cause the bicycle 200 to displace and travel. Therefore, the reciprocating motion of the reciprocating mechanism 100 can be used as the traveling power or source of the bicycle 200.

The operation or actuation mechanism of the reciprocating mechanism 100 of the present disclosure will be described in the following paragraphs. For ease of understanding, each element will be simplified as a line and will be illustrated in a planar schematic view, and the size ratio of some elements will be appropriately adjusted for illustrating the operation mechanism more clearly.

Figure 6:
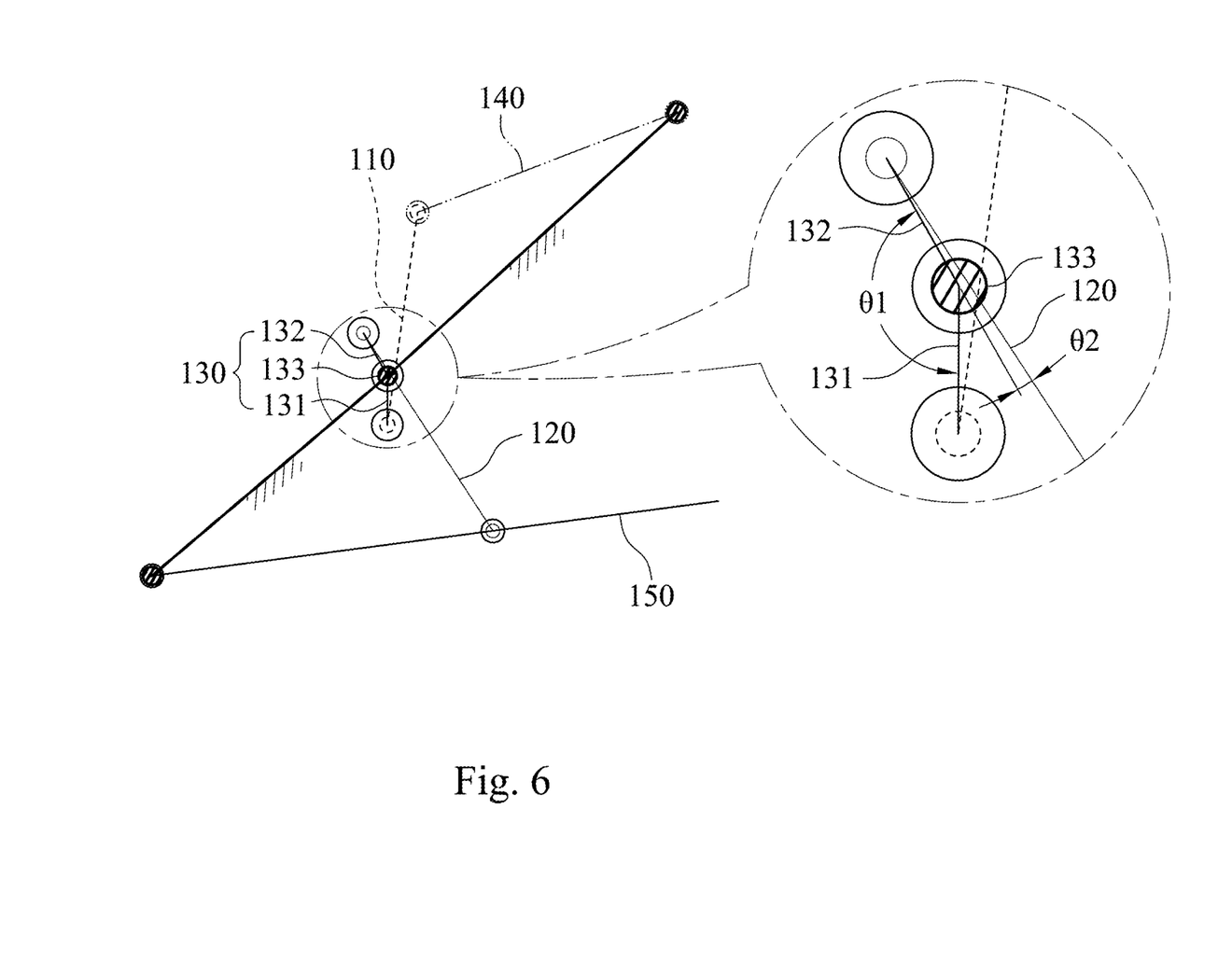
FIG. 6 is a schematic view of a first operating status of the reciprocating mechanism according to the embodiment in FIG. 1.
Figure 7:
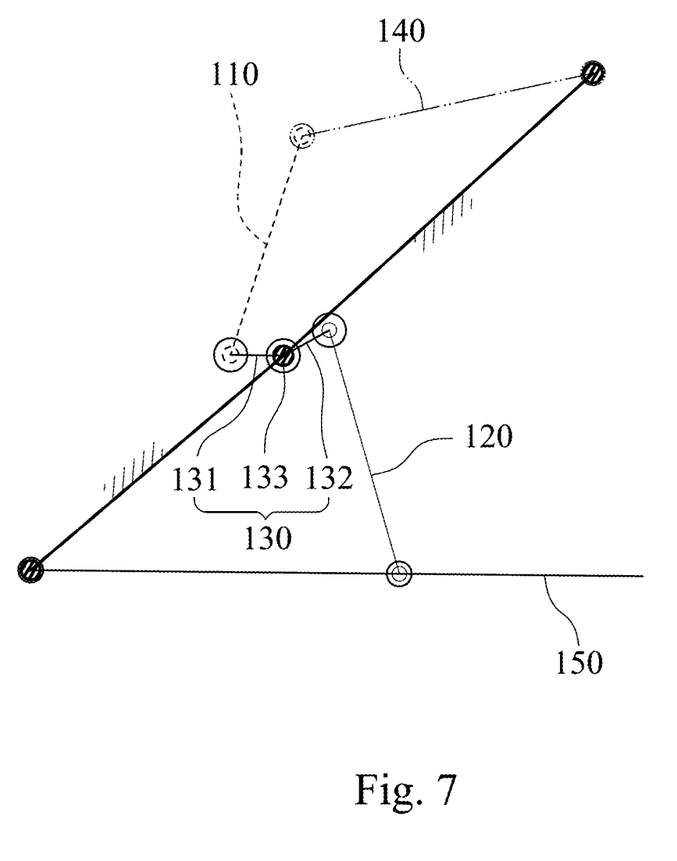
FIG. 7 is a schematic view of a second operating status of the reciprocating mechanism according to the embodiment in FIG. 1.
Figure 8:
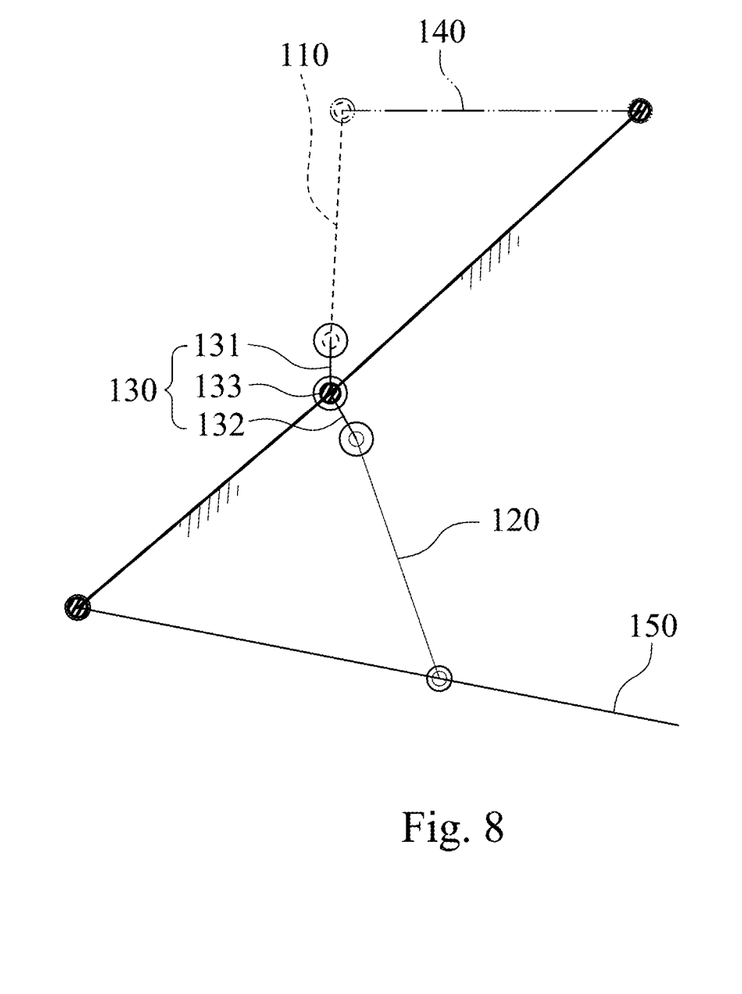
FIG. 8 is a schematic view of a third operating status of the reciprocating mechanism according to the embodiment in FIG. 1.
Figure 9:
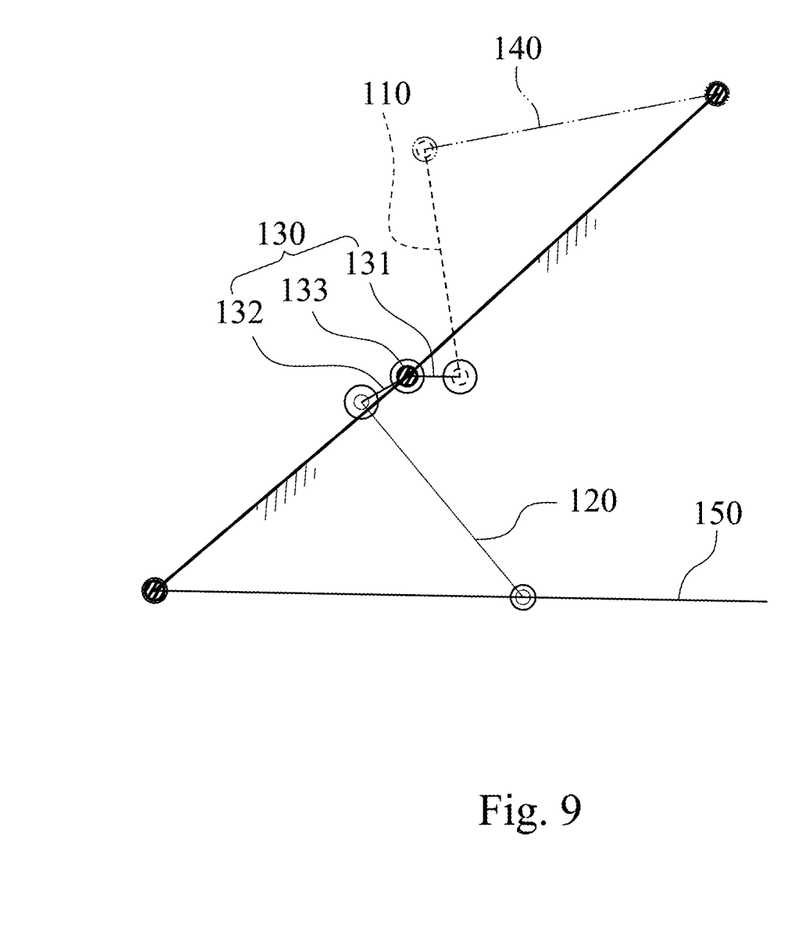
FIG. 9 is a schematic view of a fourth operating status of the reciprocating mechanism according to the embodiment in FIG. 1.

FIG. 6, FIG. 7, FIG. 8 and FIG. 9 are schematic views of a first operating status, a second operating status, a third operating status and a fourth operating status, respectively, of the aforementioned reciprocating mechanism 100, and FIG. 1 to FIG. 5 are referred herein. In FIG. 6, the first angle 81 is formed between the first following element 131 and the second following element 132, and the second angle 82 is formed between the second following element 132 and the second connecting element 120. In the embodiment of FIG. 6, the first angle 81 is 150 degrees, and the second angle 82 is 3.6 degrees. When the bracket 150 pivots downward via a user pedaling, the second connecting element 120 is movably coupled to pivot, and the second following element 132 is simultaneously caused or carried to rotate clockwise around the rotation shaft 133. At the same time, the first following element 131 and the second following element 132 are disposed on two opposite sides, respectively, of the rotation shaft 133, so as to be movably coupled to and cause the first following element 131 to rotate clockwise while the second following element 132 rotating clockwise. Since the relative positions of the first following element 131 and the second following element 132 are fixed, and the first connecting element 110 is movably coupled to first following element 131, the first connecting element 110 is driven to pivot upward via the first following element 131 rotating, and the seat cushion 140 is driven to pivot upward. Accordingly, in the present disclosure, when the bracket 150 pivots downward, the seat cushion 140 pivots upward, as shown in the continuous operating statuses of FIG. 7 to FIG. 8. In FIG. 8, when the bracket 150 is pedaled to pivot downward to a lowest position, the seat cushion 140 also pivots upward to a highest position. At the same time, the seat cushion 140 starts to pivot downward due to a pressing downward weight of the rider, the first connecting element 110 is movably coupled to pivot downward, the first following element 131 is driven to continuously rotate clockwise around the rotation shaft 133, the second following element 132 is driven to continuously rotate clockwise around the rotation shaft 133, and the bracket 150 is driven to pivot upward by the second following element 132 rotating. Accordingly, when the seat cushion 140 pivots downward, the bracket 150 pivots upward relatively, as shown in the continuous operating statuses of FIG. 8 to FIG. 9. Hence, through the first following element 131 and the second following element 132 of the crankshaft 130 rotating around the rotation shaft 133, the first connecting element 110, the seat cushion 140, the second connecting element 120 and the bracket 150 are movably coupled to each other to pivot and achieve the reciprocating motion similar to the horse-riding motion. Furthermore, through the first following element 131 and the second following element 132 relatively and periodically rotating around the rotation shaft 133, each of the first connecting element 110 and the second connecting element 120 can be driven to achieve the periodic and cyclically reciprocating motion along the arc-shaped trajectory. When the rider sits on the seat cushion 140, not only the seat cushion 140 reciprocating and pivoting, but also the pedaling motion of the foot or feet being performed on the bracket 150, the rider can feel the reciprocating motion of the complex movement trajectory of up, down, front and back, and thereby the effect of horse-riding can be more realistically simulated so as to achieve the purpose of whole body exercise. In more detail, the seat cushion 140 is configured for a buttock of the rider to sit thereon and is movably coupled to and causes the first connecting element 110 to operate by the buttock with a motion; the bracket 150 is configured for the foot of the rider to pedal thereon and is movably coupled to and causes the second connecting element 120 to operate by the foot with a motion. Therefore, the bicycle 200 can achieve a more comprehensive exercise effect by the first connecting element 110 and the second connecting element 120 being movably coupled to the buttock and the foot, respectively, with motions of the rider. In the embodiment of FIG. 1, when the gear 214 is mounted, the gear 214 can be driven to rotate by the rotation shaft 133 of the crankshaft 130 rotating, and the first tire 216 can be driven to rotate by the belt body 215 so as to drive the second tire 217 to rotate and thereby drive the whole bicycle 200 to travel with forward displacement. In another embodiment, a motor (not shown in drawings) may be mounted to automatically drive the gear 214 to rotate.

Figure 10:
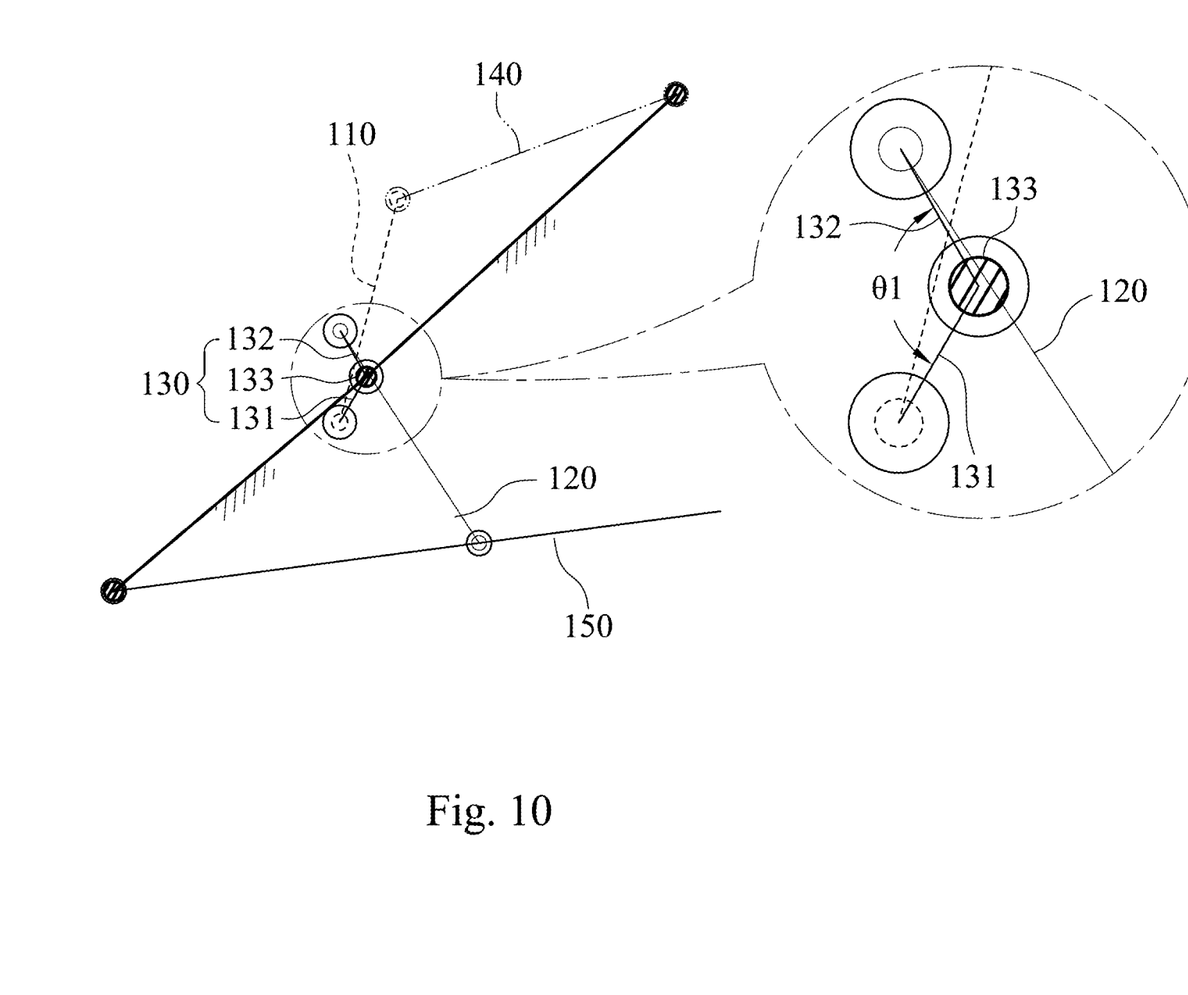
FIG. 10 is a schematic view of adjusting a first angle formed between a first following element and a second following element according to an embodiment of the present disclosure.

With reference to FIG. 10, FIG. 10 is a schematic view of adjusting the first angle 61 formed between the first following element 131 and the second following element 132 according to another embodiment of the present disclosure. The relative geometric relationships of the movements of the elements in the reciprocating mechanism 100 according to the present disclosure can be fine-tuned by adjusting the angular value of the first angle 61. In the embodiment of the aforementioned FIG. 6, the first angle 81 formed between the first following element 131 and the second following element 132 is 150 degrees. In the embodiment of FIG. 10, the first angle 81 formed between the first following element 131 and the second following element 132 is 120 degrees. Therefore, when the reciprocating mechanism 100 achieves the reciprocating motion, the rotation shaft 133 of the crankshaft 130 can still be maintained to rotate clockwise, so as not to cause conflicts in the movably coupling operations among elements, which will result in damages of the elements or mutual interferences being unable to operate. It should also be mentioned in the present disclosure, when the first angle 81 formed between first following element 131 and the second following element 132 is greater than or equal to 120 degrees, and the second angle 82 formed between the second connecting element 120 and the second following element 132 is greater than 0.1 degrees, the continuous reciprocating motion as shown in FIG. 6 to FIG. 9 of the present disclosure can be achieved without mutual interferences or collisions among the elements. Accordingly, it is important for adjusting the angular ranges of the first angle 81 and the second angle 82. In addition, the reciprocating mechanism 100 can be used as the traveling power of the bicycle 200 because the crankshaft 130 in rotation is movably coupled to and causes the first connecting element 110 and the second connecting element 120 to make the reciprocating motion. If possible, the rotation shaft 133 of the crankshaft 130 can rotate clockwise or counterclockwise. However, when it rotates counterclockwise, it is easy to cause the elements to interfere with each other or occur idling. Accordingly, in another embodiment, the bicycle 200 may further include a ratchet (not shown in drawings), which can be configured for restricting the reciprocating and cyclically pivoting direction of each of the first connecting element 110 and the second connecting element 120. In other words, through the function of the one-way restriction of the ratchet, the rotation shaft 133 of the crankshaft 130 can be ensured to rotate clockwise, so as to ensure the first connecting element 110 and the second connecting element 120 to perform the periodic and cyclically reciprocating motion along the clockwise arc-shaped trajectory.

Figure 11:
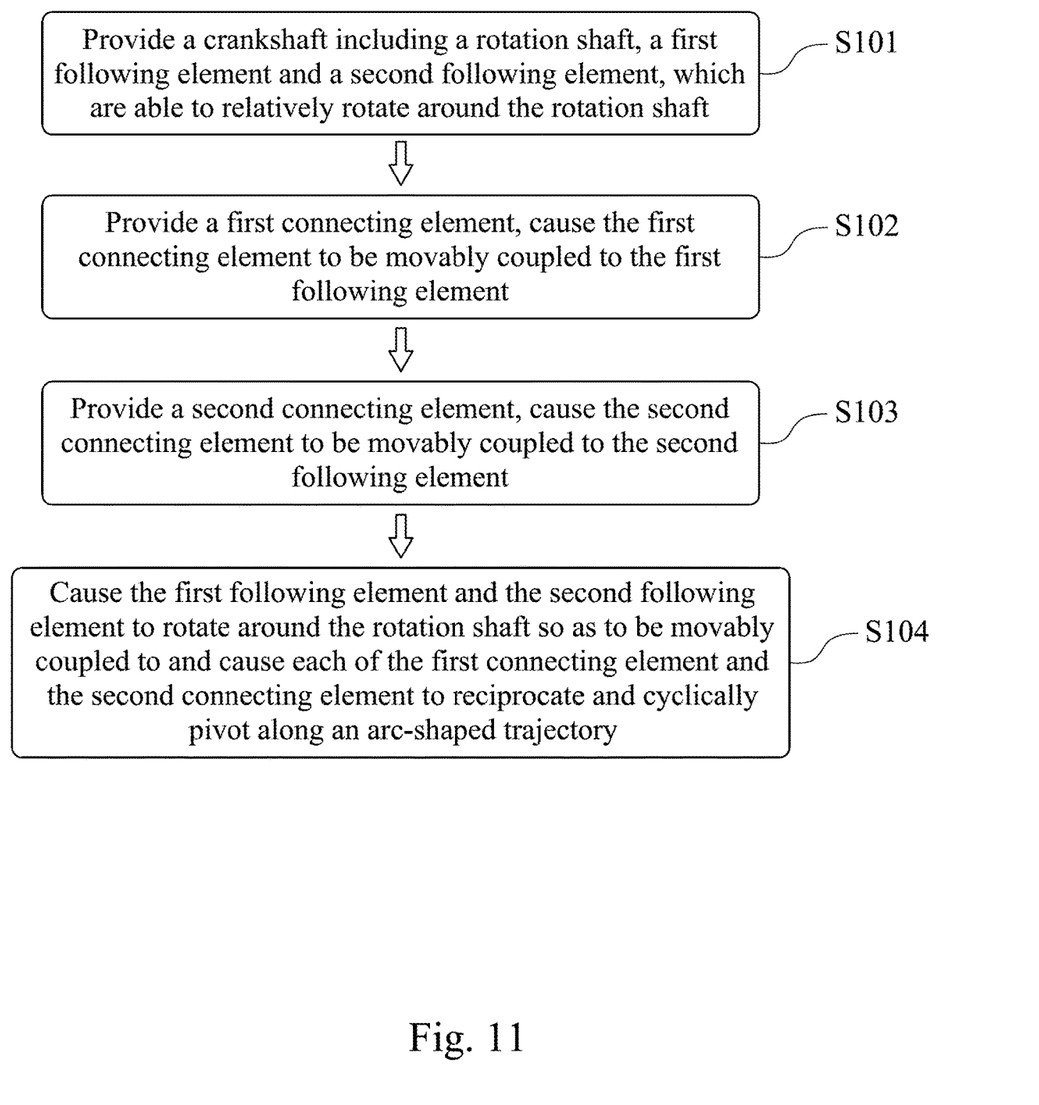
FIG. 11 is a flowchart of a method of achieving a reciprocating motion according to an embodiment of the present disclosure.

Please continue to refer to FIG. 11, which is a flowchart of a method of achieving a reciprocating motion according to an embodiment of the present disclosure. According to the aforementioned reciprocating mechanism 100, the present disclosure provides the method of achieving the reciprocating motion. The method of achieving the reciprocating motion includes: step S101 providing the crankshaft 130, wherein the crankshaft 130 includes the rotation shaft 133, the first following element 131 and the second following element 132, and the first following element 131 and the second following element 132 are able to relatively rotate around the rotation shaft 133; step S102 providing the first connecting element 110, causing the first connecting element 110 to be movably coupled to the first following element 131; step S103 providing the second connecting element 120, causing the second connecting element 120 to be movably coupled to the second following element 132; step S104 causing the first following element 131 and the second following element 132 to rotate around the rotation shaft 133 so as to be movably coupled to and cause each of the first connecting element 110 and the second connecting element 120 to reciprocate and cyclically pivot along the arc-shaped trajectory.

Therefore, the present disclosure can apply the reciprocating mechanism 100 to the bicycle 200, a horse-riding machine or the like, and through the first connecting element 110 and the second connecting element 120 pivoting, the buttock and the feet, respectively, of the rider are driven to achieve the periodic motions with the arc-shaped trajectories. Accordingly, the effect of simulating horse-riding can be achieved. If it is mounted on the bicycle 200, it can also be used as the power source to drive the bicycle 200 forward.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A reciprocating mechanism, comprising:
a first connecting element;
a crankshaft comprising:
a rotation shaft;
a first following element pivotally disposed on one side of the rotation shaft and movably coupled to the first connecting element; and
a second following element pivotally disposed on the other side of the rotation shaft, wherein one end of the second following element is pivotally connected to the rotation shaft, and a first angle is formed between the first following element and the second following element; and
a second connecting element movably coupled to the other end of the second following element;
wherein the first following element and the second following element are configured to rotate around the rotation shaft so as to be movably coupled to and cause each of the first connecting element and the second connecting element to reciprocate and cyclically pivot along an arc-shaped trajectory.

2. The reciprocating mechanism of claim 1, wherein a pivoting direction of the first connecting element and a pivoting direction of the second connecting element are different.

3. The reciprocating mechanism of claim 1, further comprising:
a seat cushion, wherein a rear end of the seat cushion is pivotally connected to the first connecting element.

4. The reciprocating mechanism of claim 1, further comprising:
a bracket, wherein the second connecting element is pivotally connected to one side of the bracket.

5. The reciprocating mechanism of claim 1, wherein the first angle is greater than or equal to 120 degrees.

6. The reciprocating mechanism of claim 1, wherein a second angle is formed between the second connecting element and the second following element.

7. The reciprocating mechanism of claim 6, wherein the second angle is greater than 0.1 degrees.

8. A bicycle, comprising:
a frame comprising a frame tube;
a reciprocating mechanism mounted on the frame and comprising:
a first connecting element;
a crankshaft comprising:
a rotation shaft;
a first following element pivotally disposed on one side of the rotation shaft and movably coupled to the first connecting element; and
a second following element pivotally disposed on the other side of the rotation shaft, wherein one end of the second following element is pivotally connected to the rotation shaft, and a first angle is formed between the first following element and the second following element; and
a second connecting element movably coupled to the other end of the second following element, wherein a second angle is formed between the second connecting element and the second following element;
a seat cushion, wherein a rear end of the seat cushion is pivotally connected to the first connecting element, and a front end of the seat cushion is pivotally connected to one end of the frame tube;
a gear sleeved on the rotation shaft;
a bracket, wherein the second connecting element is pivotally connected to one side of the bracket;
a first tire mounted on the frame; and
a belt body wound around the gear and movably coupled to the first tire;
wherein the first following element and the second following element are configured to rotate around the rotation shaft so as to be movably coupled to and cause each of the first connecting element and the second connecting element to reciprocate and cyclically pivot along an arc-shaped trajectory, so as to drive the bracket and the seat cushion to reciprocate and cyclically pivot, thereby the belt body is movably coupled to and causes the first tire to simultaneously rotate via the gear being driven to rotate by the rotation shaft.

9. The bicycle of claim 8, further comprising:
a second tire mounted on the frame and driven to rotate by the first tire, so as to drive the bicycle to displace.

10. The bicycle of claim 9, further comprising:
a ratchet configured for restricting a reciprocating and cyclically pivoting direction of each of the first connecting element and the second connecting element.

11. The bicycle of claim 8, wherein the seat cushion is configured for a buttock of a rider to sit thereon and is movably coupled to and causes the first connecting element to operate by the buttock with a motion;
the bracket is configured for a foot of the rider to pedal thereon and is movably coupled to and causes the second connecting element to operate by the foot with a motion, the first connecting element and the second connecting element reciprocate and cyclically pivot to drive each of the buttock and the foot of the rider to achieve a periodic motion with an arc-shaped trajectory.

12. A method of achieving a reciprocating motion, comprising:
providing a crankshaft, wherein the crankshaft comprises a rotation shaft, a first following element and a second following element, one end of the second following element is pivotally connected to the rotation shaft, and the first following element and the second following element are able to relatively rotate around the rotation shaft;
providing a first connecting element, causing the first connecting element to be movably coupled to the first following element;
providing a second connecting element, causing the second connecting element to be movably coupled to the other end of the second following element;
causing the first following element and the second following element to rotate around the rotation shaft so as to be movably coupled to and cause each of the first connecting element and the second connecting element to reciprocate and cyclically pivot along an arc-shaped trajectory.

13. The method of achieving the reciprocating motion of claim 12, wherein a pivoting direction of the first connecting element and a pivoting direction of the second connecting element are different.

14. The method of achieving the reciprocating motion of claim 12, further comprising:

movably coupling to and causing the first connecting element to operate by a buttock with a motion of a rider;

movably coupling to and causing the second connecting element to operate by a foot with a motion of the rider; and driving each of the buttock and the foot of the rider to achieve a periodic motion with an arc-shaped trajectory by the first connecting element and the second connecting element reciprocating and cyclically pivoting.

* * * * *